United States Patent
Hakansson et al.

(10) Patent No.: US 8,322,208 B2
(45) Date of Patent: Dec. 4, 2012

(54) FLUID METER WITH PRESSURE PROTECTION

(75) Inventors: Marie Hakansson, Limhamn (SE); Bengt I. Larsson, Skivarp (SE)

(73) Assignee: Dresser, Inc., Addison, TX (US)

( * ) Notice: Subject to any disclaimer, the term of this patent is extended or adjusted under 35 U.S.C. 154(b) by 125 days.

(21) Appl. No.: 12/900,052

(22) Filed: Oct. 7, 2010

(65) Prior Publication Data

US 2011/0100115 A1 May 5, 2011

(30) Foreign Application Priority Data

Oct. 7, 2009 (EP) .................................. 09012703

(51) Int. Cl.
*G01F 3/14* (2006.01)
(52) U.S. Cl. ............................................... 73/247
(58) Field of Classification Search .............. 73/247, 73/248, 250

See application file for complete search history.

(56) References Cited

U.S. PATENT DOCUMENTS

| | | |
|---|---|---|
| 1,882,632 A | 10/1932 | Jaworowski |
| 2,113,526 A | 4/1938 | Wydler |
| 2,198,759 A | 4/1940 | Cadet |
| 2,257,590 A * | 9/1941 | Brouse ............................. 73/247 |
| 2,756,726 A | 7/1956 | Ainsworth |
| 3,159,030 A * | 12/1964 | Maginnis ......................... 73/247 |
| 4,526,032 A | 7/1985 | Huester |
| 5,648,606 A | 7/1997 | Spalding |
| 5,686,663 A | 11/1997 | Spalding |
| 5,811,676 A | 9/1998 | Spalding |
| 6,282,951 B1 | 9/2001 | Loga et al. |
| 2007/0154332 A1 | 7/2007 | Larsson |

FOREIGN PATENT DOCUMENTS

| | | |
|---|---|---|
| GB | 790 522 A | 2/1958 |
| WO | WO 98/49530 | 11/1998 |

OTHER PUBLICATIONS

Extended European Search Report for EP Application No. 09012702.8 dated Jan. 27, 2010, 4 pages.
Extended European Search Report for EP Application No. 09012703.6 dated Jan. 22, 2010, 5 pages.
Extended European Search Report for EP Application No. 09012704.4 dated Jan. 22, 2010, 5 pages.

* cited by examiner

*Primary Examiner* — Jewel V Thompson
(74) *Attorney, Agent, or Firm* — Woodcock Washburn LLP

(57) ABSTRACT

A fluid meter is described having a housing with housing walls defining a measurement volume, an inlet to connect the measurement volume to a fuel reservoir, and an outlet to connect the measurement volume to a fuel dispensing hose, wherein the housing walls may comprise one or more elastically displaceable wall portions arranged to be elastically displaced in response to a pressure variation propagating into the measurement volume.

28 Claims, 4 Drawing Sheets

FLUID METER WITH PRESSURE PROTECTION

CLAIM OF PRIORITY

Under 35 U.S.C. §119, this application claims the benefit of a foreign priority filed in the European Patent Office, serial number 09012703.6, filed Oct. 7, 2009, the entire contents of which are hereby incorporated by reference.

TECHNICAL FIELD

The present invention relates generally to a fluid meter for volume measurement of a flowing fluid. More particularly, the present invention relates to a fluid meter with elastically displaceable walls.

BACKGROUND ART

Fuel dispensers that are used at gas stations for filling fuel tanks of motor vehicles commonly comprise an underground fuel tank, a pump unit, a flow meter, a hose, and an outlet nozzle. The pump unit pumps fuel from the underground tank creating a flow of fuel through the flow meter, the hose and the outlet nozzle. The user of the fuel dispenser utilizes the outlet nozzle to fill the vehicle's fuel tank by pressing in a handle in the nozzle grip.

A fluid meter type commonly used for fuel dispensers is shown by Ainsworth, U.S. Pat. No. 2,756,726 and Spalding, U.S. Pat. No. 5,686,663 and WO 98/49530. In these disclosures a meter having a multiple piston hydraulic motor is used. Fluid is allowed to enter cylinders and cause reciprocation of the pistons. The pistons are connected to a shaft that will rotate as an effect of the reciprocation. A rotary valve, coupled to the shaft, admits liquid to the cylinders or permits flow to the outlet connections, in proper timed relation. The fluid meter utilizes what may be termed "hypothetical" cylinders, mechanically and hydraulically cooperating with the cylinders and pistons which are structurally existent. This is accomplished by arranging the ports and the rotary valve so as to sequentially admit fluid to both the crankcase and the ends of the cylinders at the same time as fluid is withdrawn from the cylinders. The fluid volume admitted to, or withdrawn from, the crankcase is the algebraic sum of the volume withdrawn from, or admitted to, the cylinders. Two pistons, actuated through the valve mechanism, advantageously 120 degrees out of phase, thus perform the work equivalent of three pistons. This reduces the actual number of cylinders required for a given capacity, reduces internal friction and pulsation, and achieve smoother operation. The two pistons are attached via connecting rods to a crankshaft with a radially offset crank pin. The crank pin engages a yoke slot in each connecting rod so that the reciprocating movement of the two pistons is transformed into a rotary motion of the crankcase in accordance with the Scotch Yoke type principle.

When using a fuel dispensing unit and releasing the nozzle handle, for example because the user has decided to stop the dispensing operation, the fuel flow will suddenly be stopped. Modern fuel dispensing units also commonly have a nozzle with a handle that can be locked in dispensing mode so that a user will not have to press down the handle during the entire dispensing operation. These fuel nozzles are normally also equipped with an automatic stop function that will stop dispensing fuel when the nozzle sense that the tank is full by simply releasing the locked handle, to abruptly stop the fuel flow.

A fuel dispensing system, as presented above, is usually a pressurized system with a pressure above atmospheric pressure of about 2-4 bar. The operating pressure will supply a reasonably high flow when the system nozzle valve is open for fuel dispensing. When the nozzle valve is abruptly closed, however, a pressure peak will propagate through the system. This pressure peak can be as high as 40 bar and will increase the wear of the components. This wear of the components due to the pressure peak is a usual cause of broken components in a fuel dispenser leading to a leaking or malfunctioning dispensing unit. A component that can be damaged by a high pressure peak is, for example, the flow meter. A leaking or broken flow meter can cause the dispensing unit to deliver the wrong readings of dispensed fuel. If the pressure wave propagates further than to the fuel pump, other fuel dispensing units in a possible fuel dispensing unit cluster can also be affected by the pressure peak.

A broken fluid meter will not only lead to malfunctioning dispensing units, but will cause additional costs in maintenance when the broken component is replaced. A leaking dispensing unit is also a fire safety issue and a health issue for users of the dispensing unit. Leaks should thus preferably be avoided all together.

One way to handle the problem of high pressure peaks in fuel dispensing units is to make the fuel hose so flexible that the pressure transient is absorbed by deformation in the hose. This, however, leads to a soft hose that is less rugged and will have a reduced lifetime. The hose could also more easily be flattened if squeezed in the dispenser or by a foot. It is rare to have a hose that is flexible enough to absorb the pressure transient sufficiently so that the remaining pressure variation is not harmful for other components in the fuel dispensing unit.

It is also known in general pressurized fluid systems to have expansion volumes/balance volumes to absorb pressure variations.

SUMMARY OF THE INVENTION

The disclosure describes a fluid meter for a fuel dispensing unit comprising a housing comprising walls defining a measurement volume, an inlet for connecting the measurement volume to a fuel reservoir, an outlet for connecting the measurement volume to a fuel dispensing hose and a nozzle connected thereto, and a measuring device arranged in the measurement volume. The fluid meter may additionally have walls that comprise an elastically displaceable wall portion arranged to be elastically deformed in response to a pressure variation propagating into the measurement volume through the inlet or outlet.

One or more of the following advantages may be achieved by using one or several elastically displaceable wall portions in the fluid meter wall. The displaceable wall portions may absorb the pressure transient and thus substantially avoid damage to all other parts of the fluid pump and all other equipment in the pressurized system of the fuel dispenser. The procedure to absorb pressure transients in the fluid meter further utilize a component that is necessary for the operation of the fuel dispenser, meaning that no additional components may be needed for the reduction of pressure transients. The latter will reduce assembling costs and produce a more compact system compared to adding one or several separate components for absorbing pressure variations.

In one or more embodiments of the disclosure, the wall portion is elastically displaceable by elastic deformation.

This is advantageous since it provides a simple solution for displacing the wall portion, using the elasticity of the wall portion material In one or more embodiments of the disclosure, the fluid meter walls comprise more than one of said elastically displaceable wall portions. Such an embodiment is advantageous when using a fluid meter with several sub volumes. In a further embodiment of the invention the fluid meter is a piston meter type fluid meter with, e.g., two pistons and three working cylinders. In a fluid meter with several sub volumes, as the multi-cylinder piston fluid meter, the pressurized system will mainly be in connection with one sub volume/cylinder at a time. Due to this fact it may be beneficial to have an elastically displaceable wall portion in each of these sub volumes/cylinders.

In one or more embodiments of the disclosure, said volume in the fluid meter comprises at least one sub volume with a cylindrical section. Furthermore, said wall portion may define an end surface of said cylindrically section. The end surface of the cylinder is normally made as a lid attached to the cylinder using some attachment means, e.g. screws. It is thus possible to manufacture a displaceable wall portion in the end surface and mount it to the fluid meter without affecting the design of the fluid meter or the design of the cylinders. A further advantage of some embodiments is that it is possible to retro-fit an end surface with a displaceable wall portion to existing fluid meters without affecting the function of the fluid meter and with minimal adjustments to the fuel dispensing unit.

In one or more embodiments of the disclosure, at least one of said sub volume further comprises a non-cylindrical section, wherein said wall portion forms a part of the walls defining said non-cylindrical section. According to this aspect of the invention a displaceable wall portion may also be incorporated in a non-cylindrical part of the fluid meter as e.g. the crank house of a piston fluid meter. It can be advantageous to have a displaceable wall portion also in the third "hypothetical" cylinder that is present in common two-piston piston meters. When the pressurized system is in fluid connection mainly or only to the crank shaft measurement volume, i.e. the "hypothetical" third cylinder, the pressure transient can be absorbed also in this compartment. In the case of an existing lid in the crank house wall, the displaceable wall portion may be advantageously placed in the lid for the same reasons as discussed above.

In one preferred embodiment said wall portion is arranged to be elastically displaced only when subjected to a pressure transient with a pressure variation of more than 1 bar. Hereby, the elastically displaceable/deformable material is not affected by small pressure variations and thus the fluid meter volume measurement accuracy is not affected during normal operation which may cause such small pressure variations. The material may only be displaced/deformed if a transient pressure variation is of such a magnitude that it could be harmful or increase the wear of the fluid meter or other components in the pressurized system. Since pressure transients normally occur when the nozzle valve is suddenly shut, no measurement error will be induced since the flow is zero immediately after the closing of the nozzle valve.

According to a further embodiment of the present invention said wall portion is attached to said housing. The ability to attach the wall portion to the fluid meter allows the wall portion to be retro-fitted to old fluid meters. The same attachment means as for the corresponding part in the old fluid meter can be used, allowing old fluid meters to be upgraded with protection for pressure transients. The wall portion can also be supported by a frame member placed circumferentially around the displaceable wall portion. This embodiment will further ease the design of a pressure transient reducing part possible to retrofit to older fluid meters.

The wall portion according to the present disclosure may be made of a material selected from the group consisting of: rubber, spring steel, plastic, and metal. These are just examples of materials that could be used. Any material that fulfils the requirements of the invention according to the above description can be used.

According to a still further embodiment of the present disclosure the walls comprise two spaced apart wall sections interconnected by means of said wall portion. A deformable wall portion could, e.g., be placed circumferentially around the cylinder of a piston fluid meter so as to connect two wall sections of walls constituting the cylinder. Another possible embodiment would be to use a ring shaped, elastically displaceable wall portion enclosing a circular shaped wall section in the end wall of the cylinder and connecting it with a radially outer wall section of said end wall.

According to a still further embodiment of the invention at least one of said wall portions is rigid. The end wall portion could, e.g., be rigid, but resiliently attached to the fluid meter housing. In that way, the wall portion can move in response to a pressure variation. The wall portion should preferably, however, in this case be connected to the fluid meter so as not to leak when a pressure variation displaces or deforms the wall portion.

BRIEF DESCRIPTION OF THE DRAWINGS

The above objects, as well as additional objects, features and advantages of the present invention, will be more fully appreciated by reference to the following illustrative and non-limiting detailed description of embodiments of the present invention, when taken in conjunction with the accompanying drawings, wherein.

DETAILED DESCRIPTION OF PREFERRED EMBODIMENTS OF THE INVENTION

A detailed description of the function of the fluid piston meter used in the figures to illustrate the invention can be found in the prior art, e.g. in U.S. Pat. No. 5,686,663, Spalding et al. and WO9849530, Spalding et al.

Figure 1:
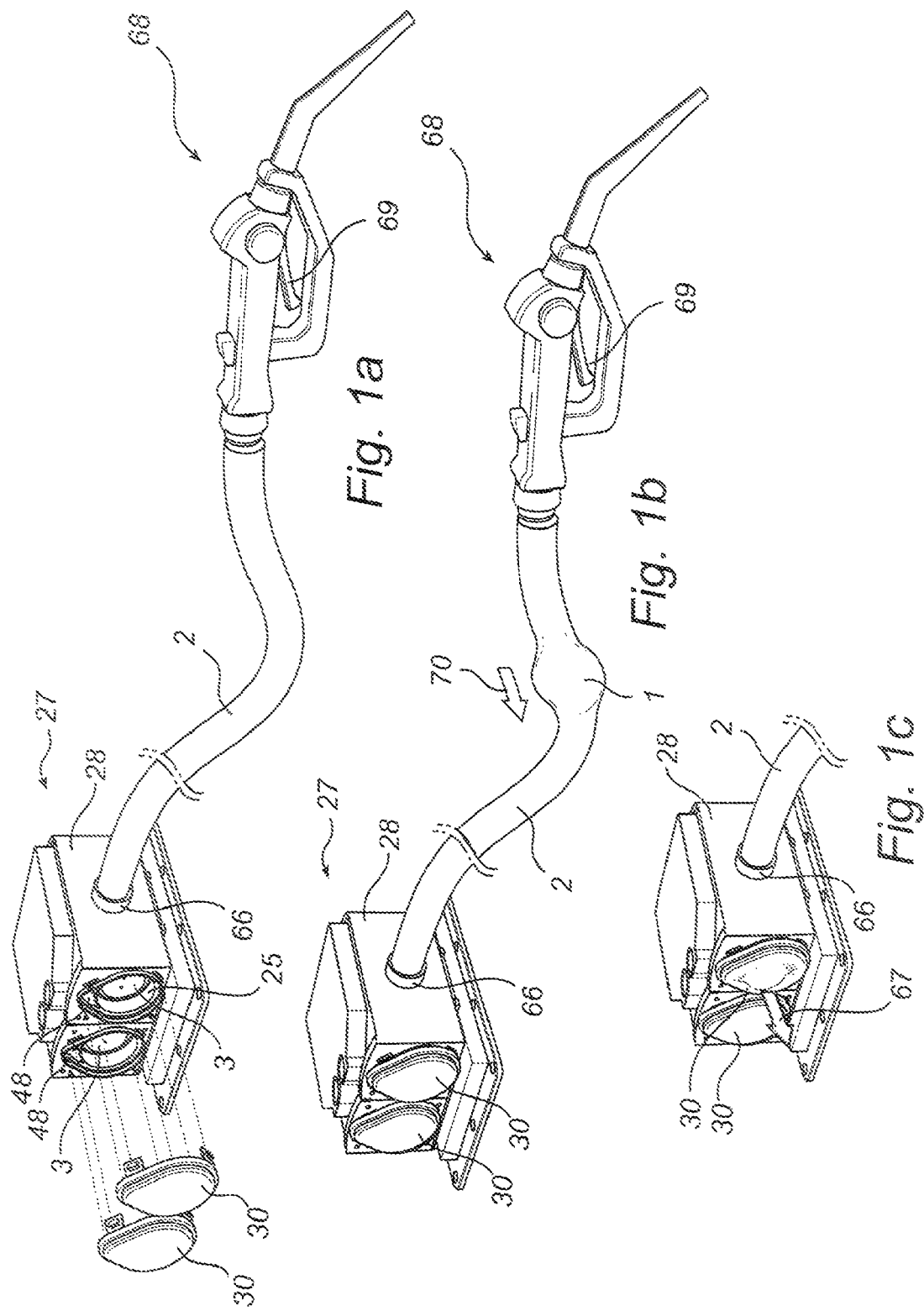
FIG. 1a is a perspective view of a double piston fluid meter in fluid connection with a nozzle via a fuel hose. Two displaceable end walls are lifted revealing the piston cylinders below and two connecting channels.
FIG. 1b is a perspective view of the double piston meter of FIG. 1a with a displaceable end wall mounted to the fluid meter. A pressure wave is shown propagating through the hose.
FIG. 1c is a perspective view of the double piston meter of FIGS. 1a and 1b showing an elastically displaced wall portion.

FIG. 1a shows a piston fluid meter 27 for a fuel dispensing unit comprising a housing with walls defining a measurement volume, an inlet for connecting said measurement volume to a fuel reservoir, an outlet for connecting said measurement volume to a fuel dispensing hose 2 and a nozzle 68 connected thereto and a measuring device arranged in said measurement volume. The walls comprise elastically displaceable wall portions 30 arranged to be elastically displaced in response to a pressure variation propagating into said measurement volume through said inlet or outlet 57, 66.

More specifically, FIG. 1*a* discloses a piston fluid meter 27 with detached displaceable wall portions 30 according to the present invention. The detached wall portions 30 constitute the end sections of the fluid meter cylinders 25 and also the end section of the fluid meter housing 28. The detached wall portions 30 makes the fluid meter pistons 3 visible in each of the open cylinders 25. Connecting channels 48 are also visible above the open cylinders 25 providing fluid connection to the inlet and an outlet rotary valve (not shown). Each connecting channel 48 is arranged above the cylinder 25 and is substantial parallel to the cylinder.

FIG. 1*b* shows the piston fluid meter of FIG. 1*a* with the wall portion 30 of the fluid meter attached. A pressure peak 1 can be seen propagating through the hose 2, towards the outlet 66 of the fluid meter. The pressure peak 1 is exaggerated in FIG. 1*b* for illustrative purposes. A real fuel hose in a fuel dispensing unit would not present a visible bulge as in the drawing.

FIG. 1*c* shows the piston fluid meter of FIGS. 1*a* and 1*b*. The pressure peak 1 has in the snapshot of FIG. 1*c* propagated via the outlet 66 of the piston fluid meter to the cylinder end wall portion 30, which wall portion is elastically displaced and deformed, in response to the pressure peak, in a substantially axial direction from the cylinder, indicated by the arrow 67.

Figure 2:
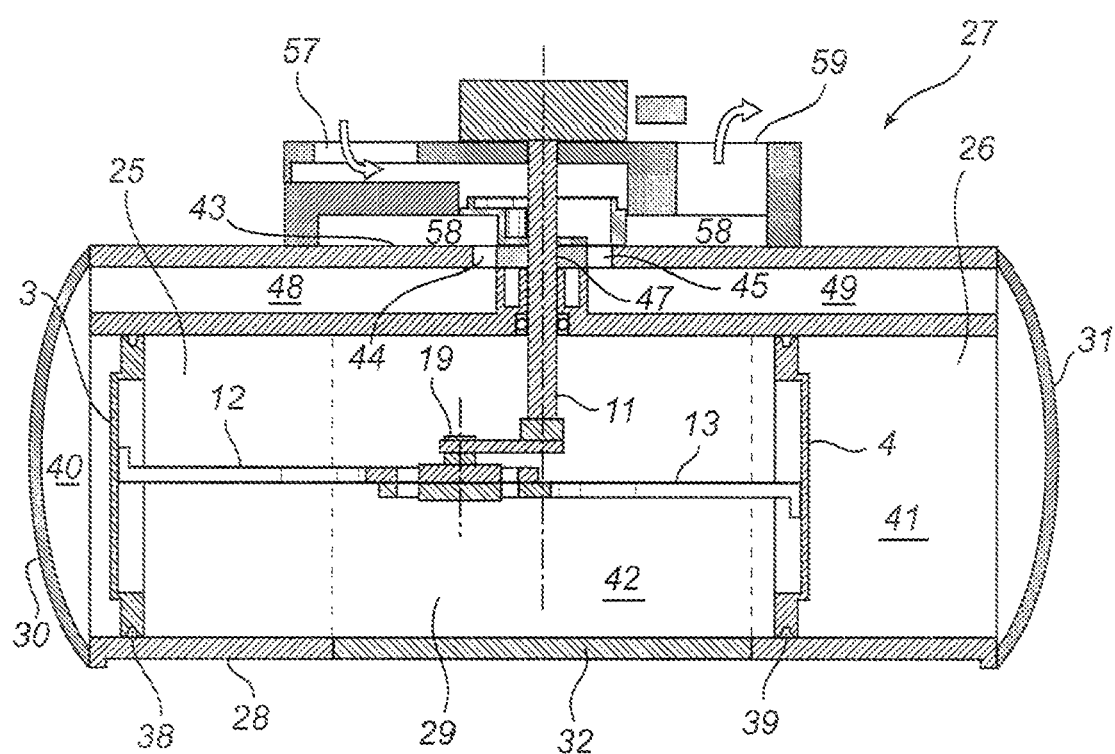
FIG. 2 is a cross sectional view of one of the fluid meters in FIGS. 1a and 1b taken along the axis of the aligned cylinders.

FIG. 2 shows the piston fluid meter 27 in cross section along the longitudinal axis of the two pistons 3, 4 in the fluid meter, i.e. through the center of the fluid meter and viewed from the side. The two pistons 3, 4 are arranged in the two cylinders 25, 26, directed 180° from one another with the crankcase 29 between them. The pistons 3, 4 divide the measurement volume in three sub volumes, 40, 41 and 42. A rotary valve 51 sequentially connects the outlet 59 and inlet ports 57 to three connecting channels 48, 49 (the third is not shown), to provide fluid connection to the two outer cylinders volumes 40, 41 and the third "hypothetical" cylinder consisting of the volume in the crank house volume 42 between the two pistons. The connecting channel leading to the crank house volume 42 is not captured in the cross section of FIG. 2. A crank shaft 11 is arranged in the center of the fluid meter. The crank shaft 11, that is connected to the rotary valve 51, is also connected via at least one crank pin 19 to the oblong slots arranged in the yokes, 12, 13. The yokes, or connecting rods, 12, 13 extend along the central axis of the two cylinders and are connected to the pistons. The crank shaft 11 is connected to the two pistons 3, 4 as described above in such a way that the pistons reciprocate in the cylinder 60° out of phase, as is well described in the prior art. Since the two pistons 3, 4 are directed 180° from one another the cylinders will be filled and emptied with a phase difference of 120°. This together with a small overlap of the operation (filling) of the three sub volumes 40, 41, 42 will ensure a pulse free operation of the fluid meter 27.

In FIG. 2, displaceable wall portions 30, 31, 32 of the invention are shown at the end sections of the two cylinders and in the bottom of the crankshaft, to respond to pressure peaks entering each of the sub volumes or cylinders 40, 41, 42 of the fluid meter. The wall portions 30, 31, 32 are elastically displaceable by elastic deformation and may be arranged to be elastically deformed as a response to a pressure variation above a predetermined threshold value, e.g., 1 bar.

Figure 3:
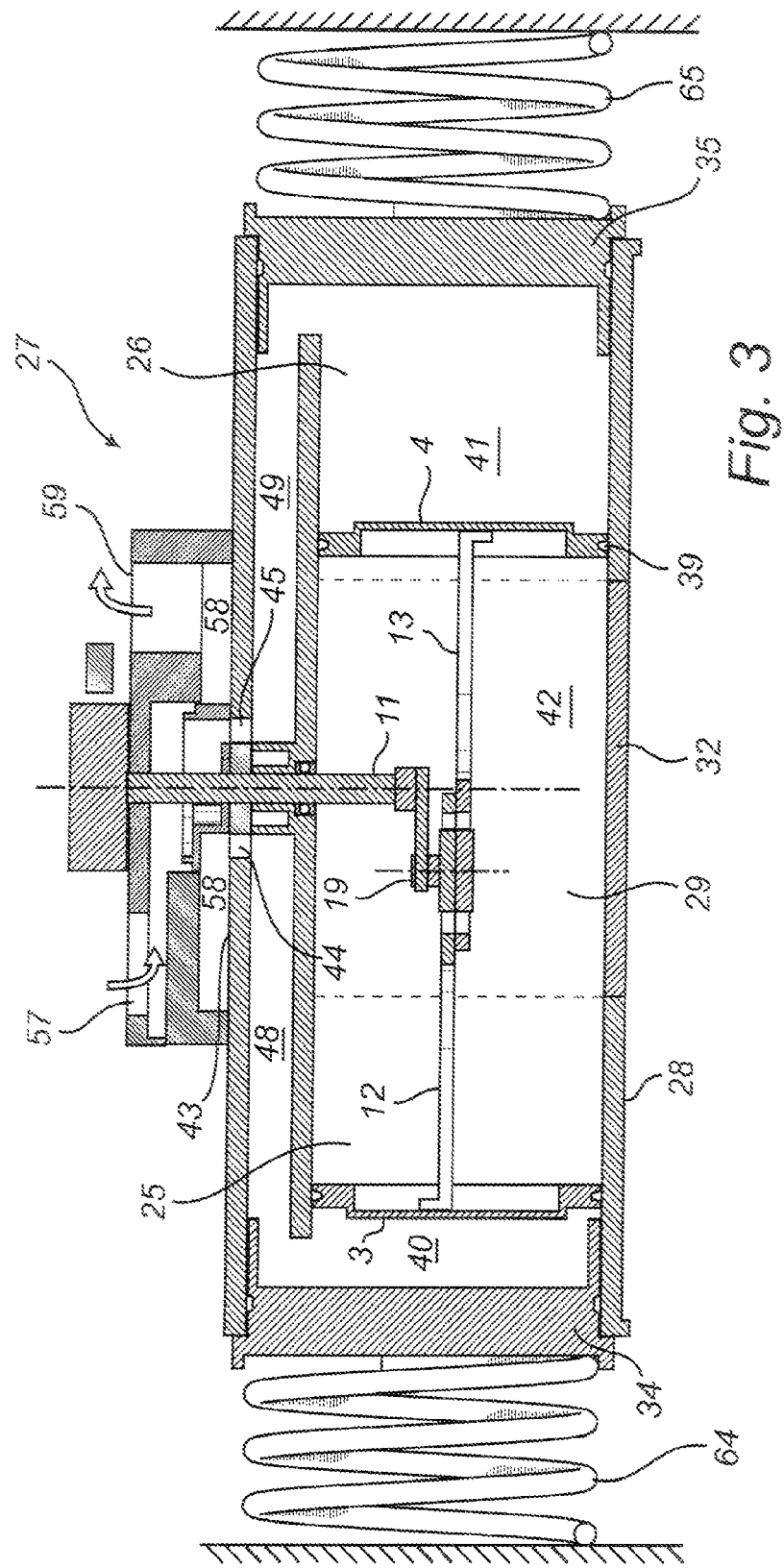
FIG. 3 is a cross sectional view of the fluid meter of FIG. 2 according to an alternative embodiment with a rigid elastically displaceable wall portion.

FIG. 3 shows an alternative embodiment. The fluid meter of FIG. 2 is modified with a different embodiment of the pressure reducing displaceable wall portion. This embodiment has a displaceable, rigid wall portion 34, 35 with a resilient member 64, 65, wherein the resilient member 64, 65 is arranged to absorb pressure variations. The rigid wall portion 34, 35 is thus elastically displaceable and constructed similar to a piston with a plate that is sealed against the inner walls of the fluid meter. The piston-like members 34, 35 have a resilient member 64, 65 on the outside that may be adapted to absorb pressure variations in the form of pressure peaks or pressure transients above a predetermined threshold.

Figure 4A:
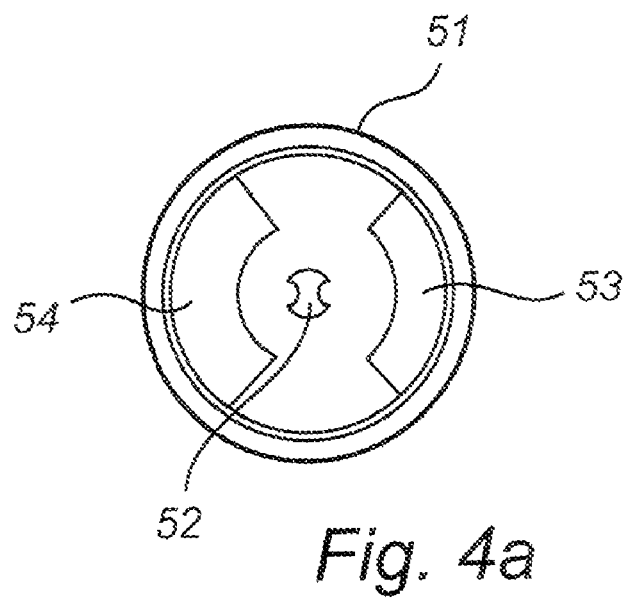
FIG. 4a is a top view of a rotary valve of the fluid meter.
Figure 4B:
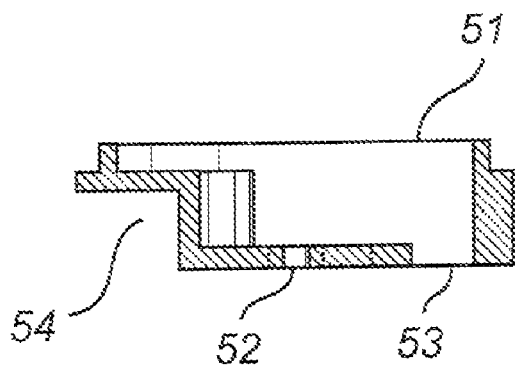
FIG. 4b is a cross sectional view of a rotary valve of the fluid meter.

FIGS. 4*a* and *b* show the rotary valve from the top and in cross section, respectively. The rotary valve 51 includes an arcuate inlet port 53 and an arcuate outlet port 54 axially and radially aligned to alternately register with the first, second, and third arcuate ports 44, 45, 46 of the valve seat 43 when the valve 51 is rotated by the crankshaft 11. The ports 53, 54 each cover an arc about the hole 52 of approximately 100° and are angularly spaced apart approximately 80° between the ports.

Figure 5:
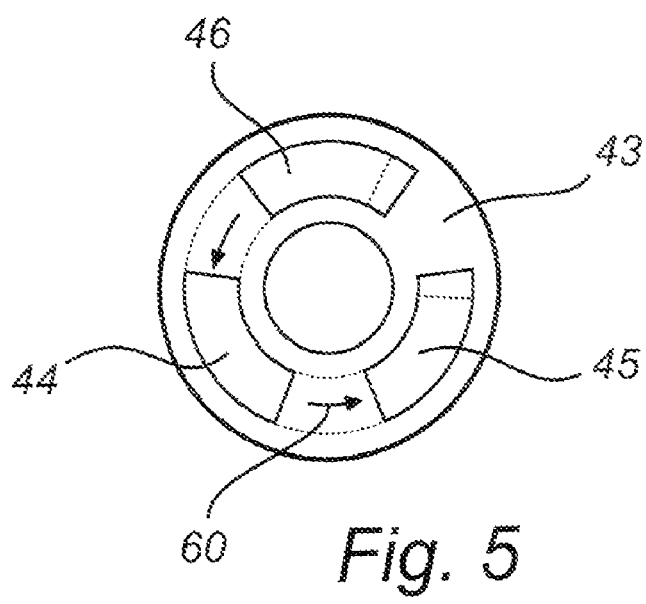
FIG. 5 is a plan view showing the ports of a rotary valve superimposed over a valve seat of the fluid meter.

FIG. 5 depicts one instantaneous position of the rotary valve ports 53, 54 (shown in phantom) superimposed over the first, second, and third ports 44, 45, 46 of the valve seat 43. In operation, the rotary valve 51 may be rotated by the crankshaft 11 in a counter-clockwise direction as indicated by the arrow 60. Accordingly, the inlet and outlet ports 53, 54 sequentially register with each of the ports 44, 45, 46. As shown in FIG. 5, the inlet port 53 is registered with the third port 46 and the outlet port 54 is registered with the second port 45. Registration of the inlet port 53 with the first port 44 is depicted as impending. Because each of the ports 44, 45, 46 cover an angle of approximately 80° and each of the rotary valve ports 53, 54 cover an angle of approximately 100°, each port 44, 45, 46 alternately registers with the inlet port 53 for 180° of rotation of the crankshaft 11 and then with the outlet port 54 for 180° of rotation. It can be appreciated that the inlet port 53 or the outlet port 54, as shown, may register with one or two, but not all three, of the ports 44, 45, 46 simultaneously. The ports 44, 45, 46 may, however, register with only one of the ports 53, 54 at a time.

Referring to FIGS. 4*a*, 4*b*, 2 and 3 the first port 44 of the valve seat 43 is in fluid communication with the first head end chamber 40 via a first passageway 48 formed in the fluid meter body 28. The second port 45 is in fluid communication with the second head end chamber 41 via a second passageway 49 formed in the fluid meter body 28. The third port 46 is in fluid communication with the crankcase chamber 42 via a third passageway (not shown) formed in the fluid meter body 28. The third port 46 is in fluid communication with the crankcase chamber 42 via a third passageway (not shown) formed in the fluid meter body 28.

Since the rotary valve 51, outlet and inlet openings are arcuate openings, each cover 100°, being 80° spaced apart and since the valve seat 43 three arcuate openings, 44, 45 (the third not shown), cover 60°, being 40° spaced apart, each of the inlet and outlet openings of the rotary valve 51 will be in fluid connection to two cylinder volumes 30% of each revolution of the rotary valve 51.

With reference to FIGS. 1*b* and 1*c*, the absorption of a pressure peak 1 will be described. Pressure peaks are commonly created when the fuel nozzle valve (not shown) in the nozzle arrangement 68 is suddenly closed. The fuel nozzle valve is closed when the dispensing operation is ended, either because a user releases the fuel dispensing handle 69 of the nozzle arrangement 68 or because the automatic filling switch (not shown) releases the same handle 69 because the tank of the vehicle being fuelled is full. A pressure peak 1 is created by the abrupt stop in flow in the dispensing system. The pressure peak 1 will propagate from the nozzle backwards in the pressurized dispensing system as indicated by the arrow 70 in FIG. 1*b*. In FIG. 1*c* the pressure pulse 1 has propagated into the fluid meter 27. The elastically displaceable—in this embodiment by elastic deformation—wall portion 30 of one of the fluid meter cylinders 25 will absorb the pressure peak 1 through deformation as can be seen in the FIG. 1*c*. The propagation of the pressure peak 1 will be described with reference to FIG. 2. The pressure peak reaching the fluid meter will enter the outlet opening 59 and enter the partly circumferential compartment 58. The rotary valve 51 is placed so as to connect the outlet compartment 58 with the connecting channel 48. The pressure peak will thus propagate through the connecting channel 48 into the cylinder volume 40, where the pressure peak will meet a dead end with a likelihood of about 70%, due to the design of the rotary valve and the valve seat openings as discussed above and which is also well described in the prior art of Ainsworth and Spalding. The displaceable end cylinder wall portion 30 is elastically deformed by the pressure peak. Depending on the position of the rotary valve, the pressure peak can reach either of the volumes 40, 41, 42. The three volumes have respective displaceable wall portions 30, 31, 32 to respond to the pressure peak.

To facilitate the mounting of the elastically displaceable wall portions and to facilitate retrofitting pressure peak reducing wall portions to older fluid meters, the displaceable wall portions 30, 31, 32 are preferably mounted in a frame (not shown). The frame can be adapted to fit most fluid meters having some kind of lid equipped opening.

FIG. 3 shows one alternative embodiment. Two of the displaceable wall portions, 34, 35 are made of a rigid material having resilient members, 64, 65, respectively, to absorb sudden pressure variations. This embodiment of the inventive elastically displaceable wall portions is advantageous if it is important to have a very precise pressure threshold for movement of the displaceable wall portion. In FIG. 3 a pressure peak has propagated backwards in the pressurized fluid system of the fuel dispenser, entered the outlet opening 59, propagated through the outlet compartment 58, the valve seat opening 44 and the connecting channel 48, finally entering the cylinder volume 40, where the pressure peak will have nowhere to go. This leads to displacement of the end wall portion 34, by deformation by the resilient member 64. If such a rigid displaceable wall portion is also needed for the crankcase volume 42, it could be arranged in the bottom lid 32.

It should be understood that the invention can be realized in a number of ways that are not shown by the embodiments in the drawings. A rigid displaceable end wall portion could, e.g., be realized by using a lid that covers the end of the fluid meter having resilient means of similar type as described in FIG. 3. The displaceable wall portion could further be: a cylindrical part of the cylinder wall making part of the fluid meter displaceable, the wall portion preferably being deformable; a ring-shaped part of the end lid having a rigid inner piece; or any part of the fluid meter wall.

An alternative embodiment is using a circular frame for the elastically displaceable wall portion, the frame having outer threads. To retrofit the pressure reducing part a hole can be drilled and threaded in a wall of the fluid meter for reception of the threaded frame with its displaceable wall section.

The invention is not limited to a piston type fluid meter as exemplified in the description. The use of the displaceable wall section according to the invention can be used for any fluid meter.

It is understood that other variations in the present invention are contemplated and in some instances, some features of the invention can be employed without a corresponding use of other features. Accordingly, it is appropriate that the appended claims be construed broadly in a manner consistent with the scope of the invention.

The invention claimed is:

1. A fluid meter, comprising:
   housing walls defining a measurement volume and comprising,
   an inlet to connect said measurement volume to a fuel reservoir,
   an outlet to connect said measurement volume to a fuel dispensing hose, and
   an elastically displaceable wall portion in said housing walls arranged to be elastically displaced in response to a pressure variation propagating into said measurement volume through said inlet or outlet.

2. A fluid meter according to claim 1, wherein said wall portion is elastically displaceable by elastic deformation.

3. A fluid meter according to claim 1, wherein said housing walls comprise more than one of said elastically displaceable wall portions.

4. A fluid meter according to claim 1, wherein said fluid meter further comprises a measuring device arranged in said measurement volume, and said measuring device comprises a piston type fluid meter.

5. A fluid meter according to claim 1, wherein the measurement volume comprises at least one sub volume with a cylindrical section.

6. A fluid meter according to claim 5, wherein said elastically displaceable wall portions define an end surface of said cylindrical section.

7. A fluid meter according to claim 5, wherein said sub volume further comprises a non-cylindrical section, and wherein said elastically displaceable wall portion for a part of the housing walls defines said non-cylindrical section.

8. A fluid meter according to according to claim 1, wherein the pressure variation is a pressure peak.

9. A fluid meter according to claim 1, wherein said elastically displaceable wall portion is arranged to be elastically displaced only when subjected to a pressure transient with a pressure variation of more than 1 bar.

10. A fluid meter according to claim 1, wherein said elastically displaceable wall portion is replaceably attached to said housing.

11. A fluid meter according to claim 1, wherein said elastically displaceable wall portion is supported by a frame member.

12. A fluid meter according to claim 1, wherein said elastically displaceable wall portion is made of a material selected from the group consisting of: rubber, spring steel, plastic, and metal.

13. A fluid meter according to claim 1, wherein said housing walls comprise two spaced apart wall sections interconnected with said elastically displaceable wall portion.

14. A fuel dispenser, comprising:
   a fluid meter comprising:
   a housing comprising housing walls defining a measurement volume,
   an inlet to connect said measurement volume to a fuel reservoir, an outlet to connect said measurement volume to a fuel dispensing hose, wherein said housing walls comprise an elastically displaceable wall portion arranged to be elastically displaced in response to a pressure variation propagating into said measurement volume through said inlet or outlet.

15. A fuel dispenser according to claim 14, wherein said elastically displaceable wall portion is elastically displaceable by elastic deformation.

16. A fuel dispenser according to claim 14, wherein said housing walls comprise more than one said elastically displaceable wall portion.

17. A fuel dispenser according to claim 14, further comprising a measuring device arranged in said measurement volume, wherein said measuring device is a piston type fluid meter.

18. A fuel dispenser according to claim 14, wherein the volume comprises at least one sub volume with a cylindrical section.

19. A fuel dispenser according to according to claim 14, wherein the pressure variation is a pressure peak.

20. A fuel dispenser according to claim 14, wherein said elastically displaceable wall portion is arranged to be elastically displaced only when subjected to a pressure transient with a pressure variation of more than 1 bar.

21. A fluid meter, comprising:
a housing comprising walls defining a measurement volume, wherein the volume comprises at least one sub volume with a cylindrical section, and wherein said sub volume further comprises a non-cylindrical section,
an inlet to connect said measurement volume to a fuel reservoir, and
an outlet to connect said measurement volume to a fuel dispensing hose,
wherein said walls comprise an elastically displaceable wall portion arranged to be elastically displaced in response to a pressure variation propagating into said measurement volume through said inlet or outlet, wherein said wall portion for a part of the walls defines said non-cylindrical section.

22. A fluid meter, comprising:
a housing comprising walls defining a measurement volume,
an inlet to connect said measurement volume to a fuel reservoir, and
an outlet to connect said measurement volume to a fuel dispensing hose,
wherein said walls comprise an elastically displaceable wall portion arranged to be elastically displaced in response to a pressure variation propagating into said measurement volume through said inlet or outlet, wherein said wall portion is replaceably attached to said housing.

23. A fuel dispenser, comprising:
a fluid meter comprising;
a housing comprising walls defining a measurement volume, wherein the volume comprises at least one sub volume with a cylindrical section,
an inlet to connect said measurement volume to a fuel reservoir, and
an outlet to connect said measurement volume to a fuel dispensing hose,
wherein said walls comprise an elastically displaceable wall portion arranged to be elastically displaced in response to a pressure variation propagating into said measurement volume through said inlet or outlet, wherein said sub volume further comprises a non-cylindrical section, and wherein said wall portion for a part of the walls defines said non-cylindrical section.

24. A fuel dispenser, comprising:
a fluid meter comprising;
a housing comprising walls defining a measurement volume,
an inlet to connect said measurement volume to a fuel reservoir, and
an outlet to connect said measurement volume to a fuel dispensing hose,
wherein said walls comprise an elastically displaceable wall portion arranged to be elastically displaced in response to a pressure variation propagating into said measurement volume through said inlet or outlet, wherein said wall portion is replaceably attached to said housing.

25. A fluid meter according to claim 1, further comprising a measuring device arranged in said measurement volume.

26. A fuel dispense according to claim 14, further comprising a nozzle to dispense fuel.

27. A fuel dispenser according to claim 14, further comprising a display.

28. A fuel dispense according to claim 14, further comprising a measuring device arranged in said measurement volume.

* * * * *